United States Patent
Christena et al.

(10) Patent No.: US 9,037,926 B2
(45) Date of Patent: May 19, 2015

(54) BACKGROUND BUFFERING OF CONTENT UPDATES

(75) Inventors: Johnathan A. Christena, Austin, TX (US); Lisa Seacat Deluca, San Francisco, CA (US); Travis M. Grigsby, Seattle, WA (US); Trevor Livingston, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 13/490,772

(22) Filed: Jun. 7, 2012

(65) Prior Publication Data

US 2013/0332782 A1    Dec. 12, 2013

(51) Int. Cl.
*G06F 11/00* (2006.01)
*G06F 11/32* (2006.01)
*H04L 12/24* (2006.01)

(52) U.S. Cl.
CPC .............. *G06F 11/32* (2013.01); *H04L 41/00* (2013.01); *G06F 11/326* (2013.01)

(58) Field of Classification Search
USPC ................................................ 714/57, 48, 49
See application file for complete search history.

(56) References Cited

U.S. PATENT DOCUMENTS

| | | | | |
|---|---|---|---|---|
| 5,615,376 | A * | 3/1997 | Ranganathan | 713/322 |
| 5,821,927 | A * | 10/1998 | Gong | 715/822 |
| 6,253,188 | B1 * | 6/2001 | Witek et al. | 705/14.54 |
| 6,594,697 | B1 * | 7/2003 | Praitis et al. | 709/225 |
| 7,313,735 | B1 * | 12/2007 | Levergood et al. | 714/47.3 |
| 7,325,045 | B1 | 1/2008 | Manber et al. | |
| 7,636,741 | B2 | 12/2009 | Kulesza et al. | |
| 7,707,594 | B1 * | 4/2010 | Foster et al. | 719/330 |
| 7,721,294 | B2 * | 5/2010 | Quinet et al. | 719/315 |
| 7,770,069 | B2 * | 8/2010 | Prescott et al. | 714/38.11 |
| 7,782,904 | B2 * | 8/2010 | Walsh | 370/474 |
| 7,882,447 | B2 * | 2/2011 | Chandler et al. | 715/778 |
| 7,970,647 | B2 * | 6/2011 | Koeppel et al. | 705/14.1 |
| 7,996,718 | B1 * | 8/2011 | Ou et al. | 714/23 |
| 8,281,401 | B2 * | 10/2012 | Pennington et al. | 726/25 |
| 8,285,808 | B1 * | 10/2012 | Joel et al. | 709/213 |
| 8,291,007 | B2 * | 10/2012 | Orr et al. | 709/203 |
| 8,438,312 | B2 * | 5/2013 | Kapur et al. | 709/246 |
| 8,458,227 | B1 * | 6/2013 | Brundage et al. | 707/804 |
| 8,521,807 | B2 * | 8/2013 | Ahn | 709/203 |

(Continued)

OTHER PUBLICATIONS

KS-Soft, "Auto Refresh in Web Interface Even Connection Lost" Jun. 20, 2007, http://www.ks-soft.net/cgi-bin/phpBB/viewtopic.php?t=4346&view=previous&sid=921f7ee2cf3e04c400d17f8c8793c668.

(Continued)

*Primary Examiner* — Loan L. T. Truong
(74) *Attorney, Agent, or Firm* — Law Office of Jim Boice (57) ABSTRACT

A computer-implemented method, system, and/or computer program product handles content availability error codes. A content refresh response, responsive to a content refresh request that requests content being displayed on a user interface to be updated, is received by and stored in a buffer in a client computer. The content refresh request was generated by a content renderer in the client computer, and the buffer is isolated from the content renderer. The content refresh response is then transmitted from the buffer to a content refresh handler, such that the content refresh handler prevents the content refresh response from being sent directly from the buffer to the content renderer without the content refresh response first being analyzed by the content refresh handler.

20 Claims, 4 Drawing Sheets

(56) References Cited

U.S. PATENT DOCUMENTS

| | | | |
|---|---|---|---|
| 8,751,633 B2* | 6/2014 | Holloway et al. | 709/224 |
| 8,775,662 B2* | 7/2014 | Yang et al. | 709/232 |
| 8,843,153 B2* | 9/2014 | Luna et al. | 455/453 |
| 8,850,580 B2* | 9/2014 | Prince et al. | 726/23 |
| 8,856,072 B2* | 10/2014 | Hannsmann et al. | 707/620 |
| 8,856,279 B2* | 10/2014 | Stavrakos et al. | 709/219 |
| 8,887,278 B2* | 11/2014 | Repasi et al. | 726/23 |
| 2002/0083130 A1* | 6/2002 | Shimada et al. | 709/203 |
| 2006/0015573 A1 | 1/2006 | Hurst-Hiller et al. | |
| 2008/0005657 A1 | 1/2008 | Sneh | |
| 2010/0131588 A1 | 5/2010 | Loftus | |
| 2012/0022942 A1* | 1/2012 | Holloway et al. | 705/14.49 |

OTHER PUBLICATIONS

Shashank Sharma, "Firefox Extensions Page Broken Link Us Back on Track," Open Tech Press, http://www.webcitation.org/61ulotRjC.

* cited by examiner

BACKGROUND BUFFERING OF CONTENT UPDATES

BACKGROUND

The present disclosure relates to the field of computers, and specifically to the use of computers when used in rendering content on a user interface. Still more particularly, the present disclosure relates to the prevention of non-recoverable errors when updating rendered content on the user interface.

A content renderer, such as a browser, will often update content being rendered on a user interface (UI), either automatically or in response to a user's input to refresh or change the rendered content. For example, the user may hit a "Forward" or "Back" button on a browser, the user may click a hyperlink within a webpage, etc. In certain content rendering systems, such as a browser using Hypertext Transfer Protocol (HTTP), if the content server (e.g., a web page server) cannot provide the requested refreshed/updated content, a 404 Error will be returned. The 404 Error results in the browser being unable to render the content, including the previously rendered content, since displaying the 404 Error causes the previously rendered content to be flushed out of the browser's cache.

SUMMARY

A computer-implemented method, system, and/or computer program product handles content availability error codes. A content request response, responsive to a content request that requests content being displayed on a user interface to be updated, is received by and stored in a buffer in a client computer. The content request was generated by a content renderer in the client computer, and the buffer is isolated from the content renderer. The content request response is then transmitted from the buffer to a content request response handler, such that the content request response handler prevents the content request response from being sent directly from the buffer to the content renderer without the content request response first being analyzed by the content request response handler.

In one embodiment, the requested content of the content request is refreshed content. A content refresh response, responsive to a content refresh request that requests content being displayed on a user interface to be updated, is received by and stored in a buffer in a client computer. A content refresh response is received by and stored in the buffer in the client computer. The content refresh request was generated by a content renderer in the client computer, and the buffer is isolated from the content renderer. The content refresh response is then transmitted from the buffer to a content refresh handler, such that the content refresh handler prevents the content refresh response from being sent directly from the buffer to the content renderer without the content refresh response first being analyzed by the content refresh handler.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As noted herein, a complex stream computer utilizes software and hardware components that interact with one another, such that a downstream component is reliant on an output from an upstream component in the complex stream computer. Thus, such systems are notoriously difficult to debug. That is, if the output of the entire stream computer fails, (i.e., if the output is an error code, is nonsense, is outside of an acceptable range, etc.), the upstream cause within the complex stream computer is difficult to identify by simply backtracking. The present invention presents a novel approach to identifying root causes in such cascade processes.

Figure 1:
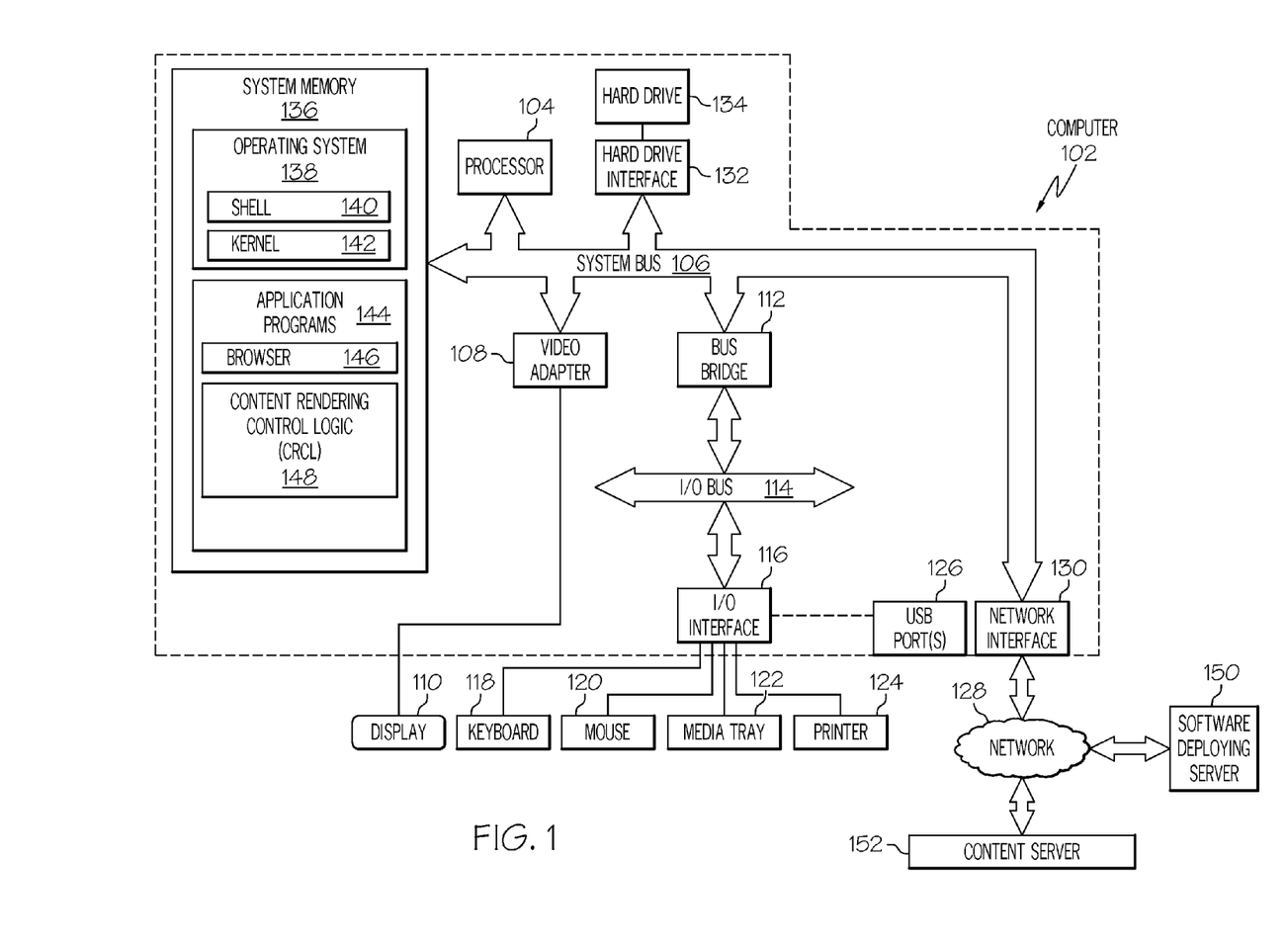
FIG. 1 depicts an exemplary system and network which may be used to implement the present invention.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or content server 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, as well as content server 152, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a content rendering control logic (CRCL) 148. CRCL 148 includes code for implementing the processes described below, including those described in FIGS. 2-4. In one embodiment, computer 102 is able to download CRCL 148 from software deploying server 150, including in an on-demand basis, wherein the code in CRCL 148 is not downloaded until needed for execution. Note further that, in one embodiment of the present invention, software deploying server 150 performs all of the functions associated with the present invention (including execution of CRCL 148), thus freeing computer 102 from having to use its own internal computing resources to execute CRCL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
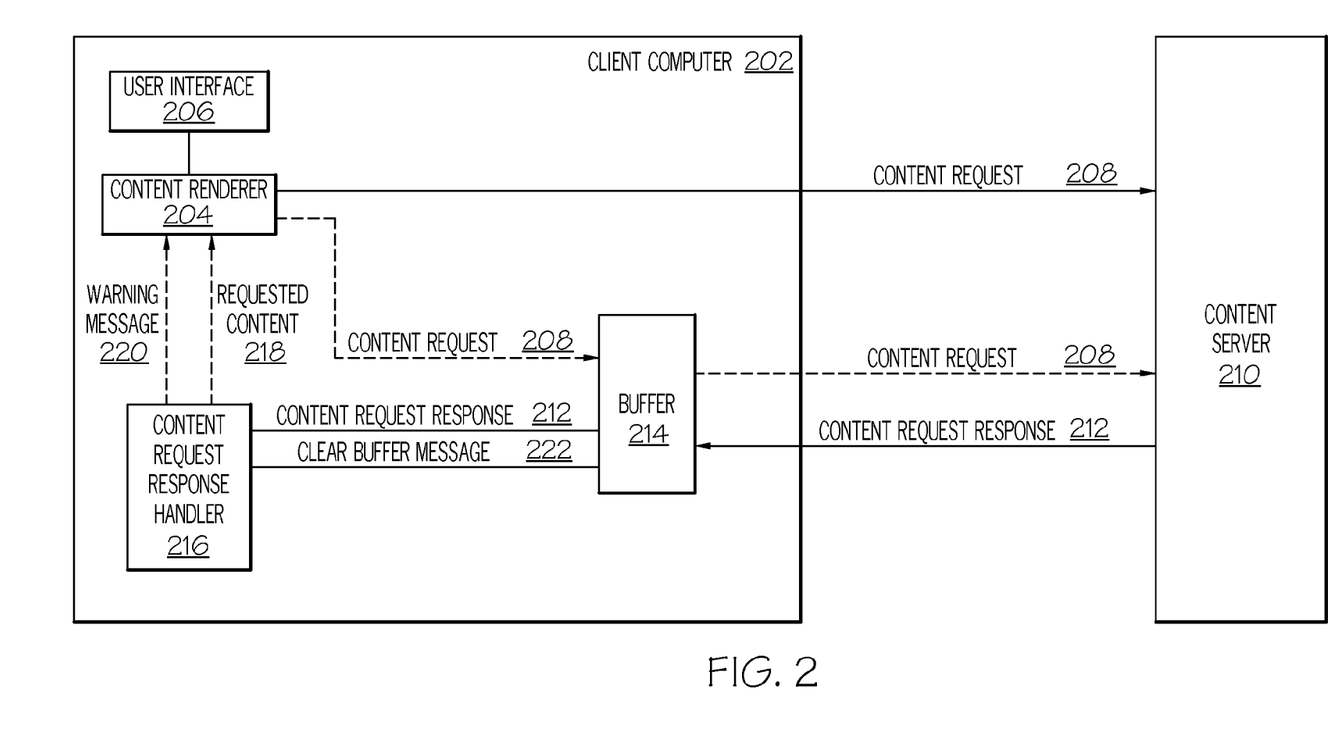
FIG. 2 illustrates a high level view of a content request response being processed by a client computer.

With reference now to FIG. 2, a high level view of a content request response being processed by a client computer is presented. A client computer 202 includes a content renderer 204, such as the browser 146 shown in FIG. 1. The content renderer 204 renders content, such as pictures, text information, web pages, etc., on a user interface 206, such as display 110 shown in FIG. 1. Periodically, the content renderer 204 will request an update to the previously rendered content, as indicated by the content request 208. Such updates may be automatically requested by the content renderer 204 (e.g., on a scheduled basis; in response to some predetermined event such as the client computer 202 restarting, an alert from another computer, either the content server or another client computer, indicating that an updated version of the rendered content has just become available; etc.), or the content can be refreshed/updated by a manual input from a user.

The content request 208 is sent to a content server 210, which may be a web page server, or any other server that provides information/data/pictures that can be rendered by the content renderer 204 on the user interface 206. The content server 210 then returns a content request response 212 to a buffer 214 in the client computer 202. Note that in one embodiment, the buffer 214 temporarily stores the content request response 212. Note also that in all embodiments, the buffer 214 is isolated (at least unidirectionally) from the content renderer 204. In one embodiment, this isolation is a physical isolation, which is due to an absence of any physical communication pathways between the buffer 214 and the content renderer 204. That is, assume that buffer 214 is a physical storage device (e.g., a dual inline memory module (DIMM), single inline memory module (SIMM), or other type of random access memory (RAM)), and the content renderer 204 is firmware within a dedicated memory device. In this embodiment, there are no wires or other physical data connectors between the buffer 214 and the content renderer 204.

In other embodiments, however, the isolation between the buffer 214 and the content renderer 204 is a logical isolation. This logical isolation utilizes software instructions to prevent the content renderer from receiving and/or sending any messages from/to the buffer. For example, assume that buffer 214 includes an interface logic, which includes an input/output (I/O) port, as well as hardware/software logic for searching the header of messages. If this logic determines that the message is from, or is being sent to, the content renderer 204, then the message is blocked by this logic without ever accepting the body of the message, such that the buffer 214 and content renderer 204 are logically isolated. Thus, the logical isolation may be bidirectional (such that messages cannot be sent in either direction between the content renderer 204 and the buffer 214), or the logical isolation may be unidirectional (such that messages may be sent directly from the content renderer 204 to the buffer 214, but not directly from the buffer 214 to the content renderer 204).

This isolation, whether physical or logical, prevents the content renderer 204 from processing error messages (e.g., HTTP 404 error messages), which cause previously rendered content on the user interface 206 to be irreversibly replaced with a "404 Error" window.

In order to avoid the irreversible display of a "404 Error" or similar message, the buffer 214 sends the content request response 212 to a content request response handler 216, which prevents the content request response from being sent directly from the buffer to the content renderer without the content request response first being analyzed by the content request response handler. That is, content request response handler 216 first examines the content request response 212, in order to determine whether it is a valid requested content or an unavailability message. If the content request response 212 is a valid requested version (i.e., an updated version) of earlier content that was displayed on the user interface 206, then the content request response handler 216 transmits the requested content 218 (i.e., the updated version of the earlier content) to the content renderer 204, which then replaces the earlier content displayed on the user interface with the updated version. However, if the content request response 212 is actually an error message, indicating that there are no updates available, and further causing this error message to completely replace what was earlier rendered on the user interface 206, then the content request handler 216 transmits a warning message 220 to the content renderer 204. This warning message 220 is constructed to provide a warning to the content renderer 204, but without causing the content renderer 204 to replace the earlier version of the rendered content with the error response.

In one embodiment, once the content request response handler 216 has transmitted either the requested content 218 or the warning message 220 to the content renderer, a clear buffer message 222 is sent to the buffer 214, causing the content request response 212 to be cleared (erased) from the buffer 214. Clearing the buffer 214 in this manner allows the buffer 214 to immediately be available to new content responses 212, and also avoids the potential of a previously received error code being sent to the content renderer 204.

Note that in the embodiment described above, the content renderer 204 transmits the content request 208 directly to the content server 210. In this embodiment, the content server 210 must be able to communicate with the buffer 214. Thus, the content request 208 must include, in the header of the content request 208, a return address (e.g., an internet protocol (IP) address) for the buffer 214, such that the content request response 212 is sent to the buffer 214 rather than to the content renderer 204.

In one embodiment, the buffer 214 sends the content request 208 directly to the content server 210. This allows the content request response 212 to be more easily bounced back from the content server 210 to the buffer 214. However, in order to preserve the isolation of the content renderer 204 from the buffer 214, buffer 214 must be logically isolated from content renderer 204 such that messages (e.g., content request 208) are able to be sent from the content renderer 204 to the buffer 214, but no messages are able to be sent directly from the buffer 214 to the content renderer 204. Thus, this isolation prevents a message such as an HTTP "404 Error" message from ever being sent to the content renderer 204, thereby avoiding the problem of irreversibly replacing previously rendered content with the "404 Error" message.

Use of the buffer 214 as the transmitter of the content request 208 provides an additional advantage over using the content renderer 204 to transmit the content request 208. Specifically, the content request response 212 may be a signal indicating that there has been a communication break between the client computer 202 and the content server 210. That is, the network 128 shown in FIG. 1 may be down, such that computer 102 and content server 152 are unable to communicate. If the buffer 214 is transmitting the content request 208, then the buffer can directly receive the message indicating that the network 128 is down. However, if the content renderer 204 transmitted the content request 208, then the content renderer 204 must forward the message indicating that the network is down to the buffer 214.

In one embodiment, the content renderer 204 is a web browser (e.g., browser 146 shown in FIG. 1), the content request 208 is an HTTP message requesting an updated version of a web page, the content server 210 is a web page server, and the content request response 212 is an error message indicating that the requested updated version of the web page is unavailable to the web page server. In one embodiment, this unavailability may be due to the web page simply being unable to locate an existing updated web page, due to routing errors, network failures, bandwidth errors, the web page server not having the address of the updated web page, etc. In another embodiment, the error message is the result of there simply being no more current version of the web page than what the browser already has (i.e., the unrefreshed version of the content currently being rendered by the browser is the most current version of the web page that is currently available from the web page server). In another embodiment, the error message is the result of a license for a user and/or particular client computer having expired, such that no updates to the web page are allowed (i.e., the unavailability message is due to an expiration of a license required to acquire updated versions of the web page). For example, assume that the user had a license to access certain financial information by paying for a subscription to this valuable information. However, if the license was never issued to the user, or if the license has expired, then a request to access such information, either through a content request or a link-based request, will be denied and an error message returned to the user.

Note that FIG. 2 illustrates a scenario in which a request is made to receive content. The concepts described herein are equally applicable to scenarios in which any content is requested, including content that results from clicking a "Forward" or "Back" button on a web browser, clicking a hyperlink that takes a user from one webpage to another webpage, clicking a "Refresh" button on a web browser, etc. The content refresh request may be automatically requested by the content renderer, or the content refresh request can be made by a manual input from a user. For example, in one embodiment, the content request may be made for the purpose of refreshing content that is currently displayed on the user interface 206. An automatic request for refreshed content may be made according to a predetermined time schedule (for example, the content renderer may request refreshed content every five minutes). In such scenarios, the content request 208 is actually a content refresh request, the content request response 212 is actually a content refresh response, and the content request response handler 216 is actually a content refresh handler.

Figure 3:
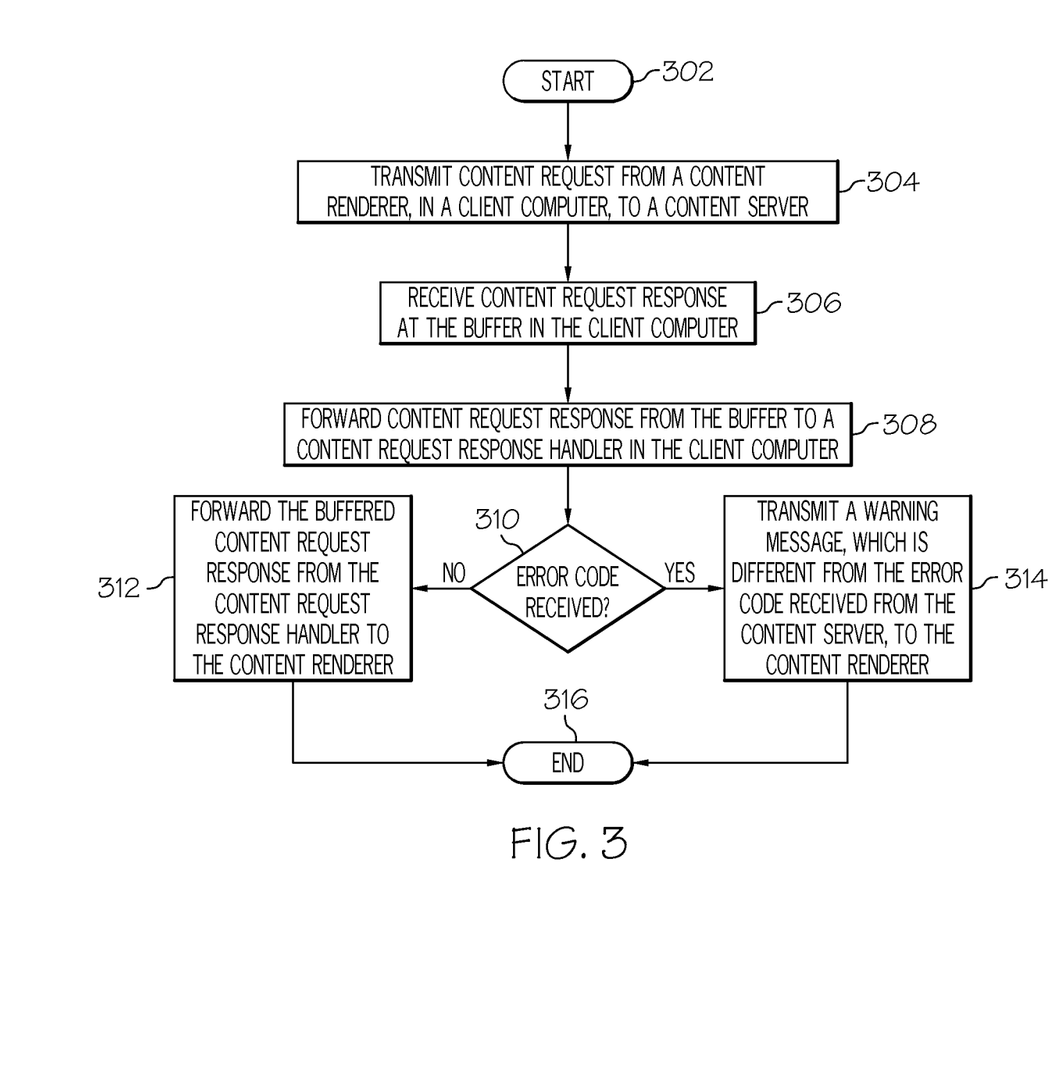
FIG. 3 is a high level flow chart of one or more exemplary steps taken by a processor or other computer hardware to process content request responses.
Figure 4:
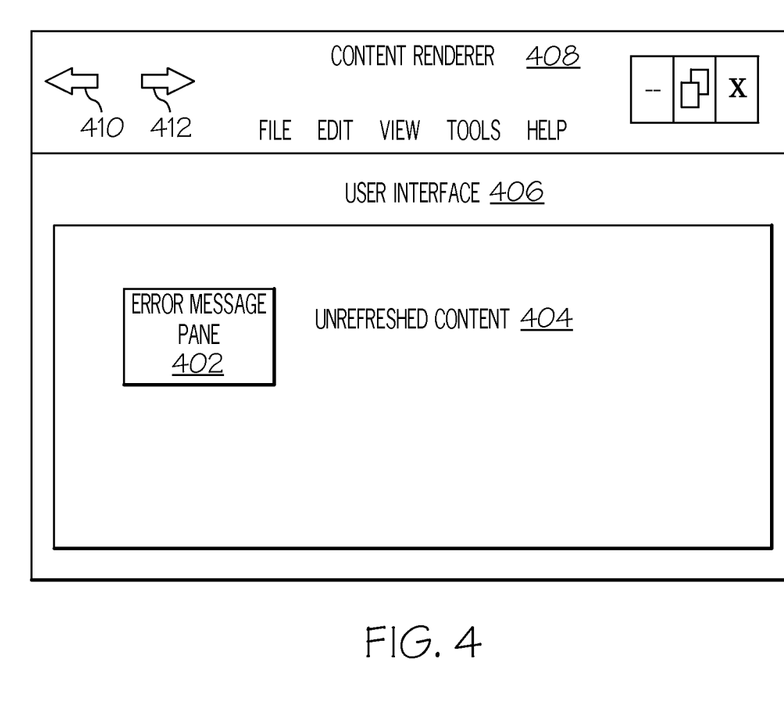
FIG. 4 is an exemplary user interface showing unrefreshed content continuing to be displayed at a client computer after receiving a content unavailability message from a content server.

With reference now to FIG. 3, a high level flow chart of one or more exemplary steps taken by a processor or other computer hardware to process content request responses is presented. After initiator block 302, a content request is transmitted, either directly or via a buffer in a client computer, from a content renderer to a content server, requesting that current content being rendered on a user interface be updated/refreshed (block 304). A content request response is then received by and stored in a buffer, which is isolated from the content renderer, in the client computer (block 306). The content request response is then forwarded from the buffer to a content request response handler in the client computer, where the content request response is first analyzed before being sent to the content renderer (block 308). If the content request response is not an error code (query block 310), but rather is a refreshed/updated version of earlier content that was displayed on the user interface, then the updated version of the earlier content is transmitted to the content renderer, along with instructions to the content renderer to replace the earlier content displayed on the user interface with the updated version (block 312). However, if the content request response is an error code, such as an HTTP "404 Error", then a warning message is sent from the content request handler to the content renderer (block 314). This warning message allows the unrefreshed version of the previously/currently displayed content to remain on the user interface. In addition, as indicated in FIG. 4, an error message pane 402 can be displayed over unrefreshed content 404 in the user interface 406 used by content renderer 408. That is, rather than replace the unrefreshed content 404 with a 404 error page (as in the prior art), the present invention allows the unrefreshed content 404 to remain on the user interface 406, while the error message pane 402 is also displayed on the user interface 406.

Furthermore, back arrow 410 and forward arrow 412 of content renderer 408 remain functional. In the prior art, a "404 Error" renders these arrows nonfunctional, since the "404 Error" removes any local rendering/recall of the stale web page. That is, in the prior art, a "404 Error" replaces the prior web page (e.g., unrefreshed content 404) in an irreversible manner, such that the prior web page cannot be recovered. The present invention overcomes this issue by retaining the prior web page in the local buffer and on the display of the user interface 406, and also retaining the ability to utilize the back arrow 410 to return to other web pages (which a "404 Error" displayed according to the prior art does not allow), as well toggle back and forth between web pages using the back arrow 410 and the forward arrow 412 (which a "404 Error" displayed according to the prior art also does not allow).

Returning to FIG. 3, the process ends at terminator block 316.

Note that while the present invention has been described within the context of requesting content, such as web pages, which results in a "404 Error", the novelty taught herein is also applicable to other scenarios. For example, an error message (including a 404 Error message) may be the result of clicking the forward or back button on a browser, clicking a hyperlink to another webpage, clicking a refresh button on a browser, etc. That is, any scenario in which information requested by a content renderer is denied (e.g., due to a denial of access to the information, a communications break between the content renderer and the content provider, a lack of an authorization/license to access the content, etc.) will benefit from the use of an intermediate, protective buffer in the manner described herein.

Note further that other HTTP protocol error messages within the "4xx" family, other than "404 Error" messages, can be handled by using the buffer in a manner described herein. Examples of such HTTP "4xx" error messages include a "400 Error Message" (caused by the server being unable to understand the request due to malformed syntax in the content request); a "401 Error Message" (caused by the requester failing to have the requisite authentication credentials); a "403 Error Message" (caused by the content server complying with a server-based rule/restriction); a "405 Error Message' (caused by an invalid method in the request); a "406 Error Message" (caused by requesting data having an unacceptable format); a "407 Error Message" (caused by a failure by a proxy to be properly authenticated); a "408 Error Message" (caused by time running out before the request was finally sent to the content server); a "409 Error Message" (caused by a conflict with the current state of the requested resource); a "410 Error Message" (caused by the requested resource having been taken off line); etc. All of these error messages may result in the current content (displayed by a content renderer) being irreversibly replaced by the error message, as with the "404 Error Message" described herein. Thus, the present invention is applicable to any such "4xx Error Message".

Besides the various 4xx HTTP errors just described, the present invention also is utilized in other HTTP errors, including the 3xx and 5xx series. For example, in the 3xx Error Code series, an error message is returned to the client indicating that the HTTP request was processed by a content provider, but the content provider returns a recommendation that the client computer try another resource. For example, a 302 Error Code indicates that the requested resource has been temporarily moved, and thus the browser should send a new request to the new resource location. A 304 Error Code indicates that there are no new versions of the requested content, and thus the client computer should simply use a locally cached version of the content. However, in some systems, the 304 Error Code makes the locally cached version unavailable, either by preemptively wiping the cache clean when the request is made, or by allowing the 304 Error Message to overwrite the buffer cache.

Similarly, a 5xx HTTP code may be returned indicating some type of error with the content server. This error may be internal to the server (i.e., a 500 Error), the server is down for maintenance (i.e., a 503 Error), etc. Again, such Error Messages may make the previously displayed/rendered content unavailable.

Furthermore, an error can occur that may or may not be conveyed in an HTTP error message. For example, if a client computer loses communication with a network (e.g., by losing a WiFi connection, accidentally pulling out an Ethernet cord, etc.), the browser may subsequently try to refresh its rendered content without success. If the system is configured such that previously rendered content is removed from, or is inaccessible from, the screen buffer, then there is no easy way for the client to repopulate the screen with the previously rendered content without using the present invention.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer-implemented method of handling content availability error codes, the computer-implemented method comprising:

receiving, at a buffer in a client computer, a content request response, wherein the content request response is received by the buffer in response to a content request, from a content renderer in the client computer, to update displayed content on a user interface on the client computer, wherein the content request response is stored in the buffer, and wherein the buffer is isolated from the content renderer; and transmitting the content request response from the buffer to a content request response handler in the client computer, wherein the content request response handler prevents the content request response from being sent directly from the buffer to the content renderer without the content request response first being analyzed by the content request response handler.

2. The computer-implemented method of claim 1, further comprising:

in response to the content request response handler determining that the content request response is an unavailability message, transmitting a warning message from the content request response handler to the content renderer, wherein the warning message allows an unchanged version of the displayed content to remain displayed on the user interface.

3. The computer-implemented method of claim 2, wherein the warning message causes an error warning to be displayed simultaneously with the unchanged version of the displayed content on the user interface, wherein the error warning indicates that the unchanged version has not been changed in response to the content request.

4. The computer-implemented method of claim 1, further comprising:
in response to said transmitting the content request response to the content request response handler, deleting the content request response from the buffer.

5. The computer-implemented method of claim 1, wherein the content request is transmitted from the content renderer to the content server while bypassing the buffer.

6. The computer-implemented method of claim 1, wherein the content request is transmitted from the content renderer to the content server via the buffer.

7. The computer-implemented method of claim 1, wherein the content renderer is a web browser, wherein the content request is an HTTP message requesting an updated version of a web page, wherein the content server is a web page server, and wherein the content request response is an error message indicating that the requested updated version of the web page is unavailable.

8. The computer-implemented method of claim 7, further comprising:
determining that the error message is due to the unchanged version of the displayed content being a most current version of the web page that is currently available from the web page server.

9. The computer-implemented method of claim 7, further comprising:
determining that the error message is due to an expiration of a license required to acquire updated versions of the web page.

10. The computer-implemented method of claim 1, further comprising:
determining that the unavailability message is due to a communication break between the client computer and the content server.

11. The computer-implemented method of claim 1, further comprising:
in response to the content request response handler determining that the content request response is an updated version of earlier content that was displayed on the user interface, transmitting the updated version of the earlier content to the content renderer, wherein the content renderer replaces the earlier content displayed on the user interface with the updated version.

12. The computer-implemented method of claim 1, wherein said buffer is isolated from said content renderer by physical isolation, wherein said physical isolation is due to an absence of any physical communication pathways between the buffer and the content renderer.

13. The computer-implemented method of claim 1, wherein said buffer is isolated from said content renderer by logical isolation, wherein said logical isolation utilizes software instructions to prevent the content renderer from receiving any messages from the buffer.

14. The computer-implemented method of claim 1, wherein said buffer is isolated from said content renderer by logical isolation, wherein said logical isolation utilizes software instructions to prevent the buffer from receiving any messages from the content renderer.

15. A computer program product for handling content availability error codes, the computer program product comprising:
a non-transitory machine-readable storage media;
first program instructions to receive, at a buffer in a client computer, a content refresh response, wherein the content refresh response is received by the buffer in response to a content refresh request, from a content renderer in the client computer, to refresh displayed content on a user interface on the client computer, wherein the content refresh response is stored in the buffer, and wherein the buffer is isolated from the content renderer; and
second program instructions to transmit the content refresh response from the buffer to a content refresh handler in the client computer, wherein the content refresh handler prevents the content refresh response from being sent directly from the buffer to the content renderer without the content refresh response first being analyzed by the content refresh handler; and wherein the first and second program instructions are stored on the non-transitory machine-readable storage media.

16. The computer program product of claim 15, further comprising:
third program instructions to, in response to the content refresh handler determining that the content refresh response is an unavailability message, transmit a warning message from the content refresh handler to the content renderer, wherein the warning message allows an unrefreshed version of the displayed content to remain displayed on the user interface; and wherein
the third program instructions are stored on the non-transitory machine-readable storage media.

17. The computer program product of claim 15, further comprising:
third program instructions to, in response to the content refresh handler determining that the content refresh response is an updated version of earlier content that was displayed on the user interface, transmit the updated version of the earlier content to the content renderer, wherein the content renderer replaces the earlier content displayed on the user interface with the updated version; and wherein
the third program instructions are stored on the non-transitory machine-readable storage media.

18. A system comprising:
a processor, a computer readable memory, and a computer readable storage media;
first program instructions to receive, at a buffer in a client computer, a content refresh response, wherein the content refresh response is received by the buffer in response to a content refresh request, from a content renderer in the client computer, to refresh displayed content on a user interface on the client computer, wherein the content refresh response is stored in the buffer, and wherein the buffer is isolated from the content renderer; and
second program instructions to transmit the content refresh response from the buffer to a content refresh handler in the client computer, wherein the content refresh handler prevents the content refresh response from being sent directly from the buffer to the content renderer without the content refresh response first being analyzed by the content refresh handler; and wherein the first and second program instructions are stored on the computer readable storage media for execution by the processor via the computer readable memory.

19. The system of claim 18, further comprising:
third program instructions to, in response to the content refresh handler determining that the content refresh response is an unavailability message, transmit a warning message from the content refresh handler to the content renderer, wherein the warning message allows an unrefreshed version of the displayed content to remain displayed on the user interface; and wherein the third program instructions are stored on the computer readable storage media for execution by the processor via the computer readable memory.

20. The system of claim 18, further comprising:
third program instructions to, in response to the content refresh handler determining that the content refresh response is an updated version of earlier content that was displayed on the user interface, transmit the updated version of the earlier content to the content renderer, wherein the content renderer replaces the earlier content displayed on the user interface with the updated version; and wherein the third program instructions are stored on the computer readable storage media for execution by the processor via the computer readable memory.

* * * * *